(12) United States Patent
Bosch et al.

(10) Patent No.: US 12,512,492 B2
(45) Date of Patent: Dec. 30, 2025

(54) METHOD FOR OPERATING A FUEL CELL SYSTEM, AND ANALYSIS UNIT FOR A FUEL CELL SYSTEM

(71) Applicant: Robert Bosch GmbH, Stuttgart (DE)

(72) Inventors: Timo Bosch, Renningen (DE); Christopher Bruns, Boeblingen (DE); Tobias Falkenau, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 18/019,360

(22) PCT Filed: Jul. 16, 2021

(86) PCT No.: PCT/EP2021/069990
§ 371 (c)(1),
(2) Date: Feb. 2, 2023

(87) PCT Pub. No.: WO2022/028859
PCT Pub. Date: Feb. 10, 2022

(65) Prior Publication Data
US 2023/0352709 A1    Nov. 2, 2023

(30) Foreign Application Priority Data
Aug. 3, 2020 (DE) ............ 10 2020 209 740.2

(51) Int. Cl.
*H01M 8/0444* (2016.01)
*H01M 8/04089* (2016.01)
(Continued)

(52) U.S. Cl.
CPC ... *H01M 8/04462* (2013.01); *H01M 8/04097* (2013.01); *H01M 8/04231* (2013.01); *H01M 8/04761* (2013.01); *H01M 2008/1095* (2013.01)

(58) Field of Classification Search
CPC ..... H01M 2008/1095; H01M 8/04097; H01M 8/04231; H01M 8/04462; H01M 8/0447;
(Continued)

(56) References Cited

U.S. PATENT DOCUMENTS

2004/0106023 A1    6/2004    Jeda et al.
2007/0026275 A1    2/2007    Sasaki et al.

FOREIGN PATENT DOCUMENTS

CN    101262068 A    9/2008
CN    107004876 A    8/2017
(Continued)

OTHER PUBLICATIONS

Translation of International Search Report for Application No. PCT/EP2021/069990 dated Nov. 11, 2021 (2 pages).
(Continued)

*Primary Examiner* — Victoria H Lynch
(74) *Attorney, Agent, or Firm* — Michael Best & Friedrich LLP

(57) ABSTRACT

The invention relates to a method for operating a fuel cell system with at least one fuel cell which is supplied with hydrogen via an anode path and oxygen via a cathode path, wherein anode exhaust gas exiting the fuel cell is recirculated, but from time to time a part of the anode exhaust gas is introduced into an exhaust gas path, which conducts the cathode exhaust gas, by purging the exhaust gas out of the anode path, and wherein the hydrogen concentration of the exhaust gas is measured in the exhaust gas path using a hydrogen sensor. According to the invention, the hydrogen and/or nitrogen concentration of the anode gas in the anode path before the last purge is calculated on the basis of the measured hydrogen concentration, the quantity of gas introduced into the exhaust gas path from the cathode path and from the anode path, and the quantity of hydrogen which is freshly supplied to the anode path.

(Continued)

The invention further relates to an analysis unit for a fuel cell system for carrying out the method according to the invention.

8 Claims, 1 Drawing Sheet

(51) Int. Cl.
  *H01M 8/04223* (2016.01)
  *H01M 8/04746* (2016.01)
  *H01M 8/10* (2016.01)

(58) Field of Classification Search
  CPC ......... H01M 8/04753; H01M 8/04761; H01M 8/1007; Y02E 60/50
  See application file for complete search history.

(56) References Cited

FOREIGN PATENT DOCUMENTS

| CN | 110277577 A | 9/2019 |
| JP | 2004178845 A | 6/2004 |
| JP | 2004192845 A | 7/2004 |
| JP | 2007040756 A | 2/2007 |
| JP | 2007280925 A | 10/2007 |
| JP | 2007294189 A | 11/2007 |
| JP | 2008047518 A | 2/2008 |
| JP | 2012004032 A | 1/2012 |

OTHER PUBLICATIONS

Anati et al., "Robot localization using soft object detection," IEEE International Conference on Robotics and Automation, 2012, 8 pages.

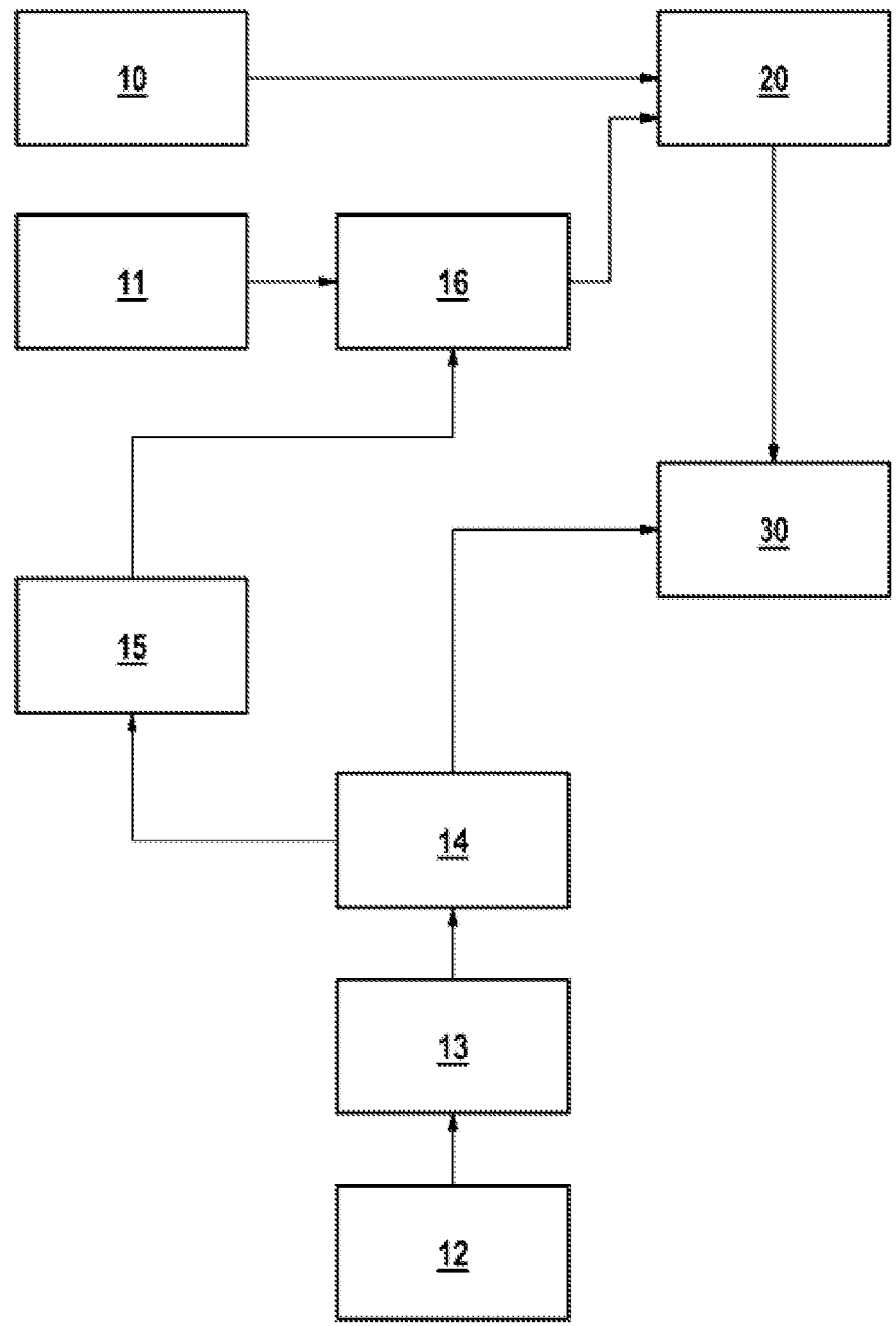

METHOD FOR OPERATING A FUEL CELL SYSTEM, AND ANALYSIS UNIT FOR A FUEL CELL SYSTEM

BACKGROUND OF THE INVENTION

The invention relates to a method for operating a fuel cell system with at least one fuel cell. Furthermore, the invention relates to an analysis unit for a fuel cell system with the help of which the method according to the invention can be carried out.

A fuel cell converts hydrogen into electrical energy using oxygen, wherein waste heat and water is generated. For this purpose, the fuel cell comprises a membrane-electrode assembly (MEA) which is supplied with hydrogen via an anode path and oxygen via a cathode path. While the hydrogen is typically stored in a tank, the oxygen can be taken from the ambient air.

In practical application, multiple such fuel cells are arranged into a fuel cell "stack" in order to increase the generated electric voltage. To supply hydrogen and air to each individual fuel cell, the fuel cell stack is permeated by supply channels. Further channels permeating the fuel cell stack serve to remove the depleted anode exhaust gas exiting the fuel cells as well as the depleted moist air.

An approach for supplying hydrogen to the fuel cell has systemically established itself in which the hydrogen-containing anode exhaust gas is fed back to the fuel cells by means of a gas conveying device. This process is called recirculation. A jet pump or a hybrid solution consisting of a jet pump and a blower can be used as the gas conveying device.

Recirculated anode exhaust gas can contain nitrogen, which reaches from the cathode side to the anode side through diffusion. The result is a reduction in cell voltage, because nitrogen represents an inert gas for the electrochemical reaction taking place in the fuel cell. When present in very high concentrations, it can also damage the cell, because it is no longer sufficiently supplied with hydrogen.

To reduce the concentration of nitrogen, the recirculation space is therefore flushed from time to time. This process is called purging. Through a purge valve, a portion of the anode exhaust gas is extracted from the recirculation space and replaced with fresh hydrogen. However, too frequent purging reduces the efficiency of the fuel cell system, because hydrogen is also extracted along with the nitrogen. Knowledge of the nitrogen concentration is therefore important in order to optimize the extraction of anode exhaust gas in terms of system efficiency while simultaneously reducing the damage to cells to a minimum.

The use of hydrogen sensors is known in the prior art. These are arranged in the anode path in order to provide reliable measured values of the hydrogen concentration. From these, the nitrogen concentration can then be inferred. However, the use of such sensors is effort-intensive and expensive. In particular, sealing problems can occur in the interface areas. Nonetheless, at least one hydrogen sensor is typically installed in an exhaust gas path of a fuel cell system. The depleted moist air (cathode exhaust gas) and the anode exhaust gas extracted from the recirculation space from time to time by purging are discharged via the exhaust gas path. The exhaust gas thus consists of a hydrogen-nitrogen-vapor mixture. The hydrogen sensor arranged in the exhaust gas path measures whether a non-critical hydrogen concentration is maintained at all times.

The problem addressed by the present invention is to specify a method for operating a fuel cell system in which the nitrogen concentration in the anode path is monitored. The monitoring is to be carried out as efficiently as possible and by available means.

The method is proposed in order to solve this problem. In addition, an analysis unit for a fuel cell system is proposed, with the help of which the method can be carried out.

SUMMARY OF THE INVENTION

The invention proposes a method for operating a fuel cell system with at least one fuel cell which is supplied with hydrogen via an anode path and with oxygen via a cathode path. Here, anode exhaust gas exiting the fuel cell is recirculated. However, from time to time a part of the anode exhaust gas is introduced into an exhaust gas path, which conducts the cathode exhaust gas, by purging the exhaust gas out of the anode path. In the exhaust gas path, a hydrogen sensor is used in order to measure the hydrogen concentration of the exhaust gas. According to the invention, the hydrogen and/or nitrogen concentration of the anode gas in the anode path before the last purge is calculated on the basis of the measured hydrogen concentration, the quantity of gas introduced into the exhaust gas path from the cathode path and from the anode path, and the quantity of hydrogen which is freshly supplied to the anode path.

If the hydrogen concentration is known, the nitrogen concentration can be derived therefrom. With the aid of the proposed method, the nitrogen concentration in the anode path can thus be directly or at least indirectly monitored. Knowing the nitrogen concentration can prevent damage to the fuel cell by purging in a timely manner. At the same time, the purging can be reduced to a minimum in order to optimize the system efficiency.

According to the proposed method, the hydrogen and/or nitrogen concentration of the anode gas is monitored using a hydrogen sensor installed in the exhaust gas path of the system. Because this is generally present, no further sensor technology is required in order to perform the method, so that it is comparatively easy to implement.

The information required to monitor the hydrogen and/or nitrogen concentration in the anode path in addition to the measurement data of the hydrogen sensor is usually known or can be readily derived from known values. This is particularly true with respect to gas quantities introduced into the exhaust gas path and/or the quantity of hydrogen freshly supplied to the anode path.

Preferably, the hydrogen concentration of the anode gas is first calculated. Knowing the hydrogen concentration, the nitrogen concentration of the anode gas is then determined. That is to say, the nitrogen concentration is derived from the hydrogen concentration of the anode gas. The nitrogen concentration is thus determined indirectly.

The calculation of the hydrogen concentration of the anode gas can be preceded by further method steps. These will be described in more detail below.

The calculation of the hydrogen concentration is preferably preceded by the method step in which a total molecular flow is first calculated from the gas quantities that are introduced into the exhaust gas path. On the basis of the calculated total molecular flow as well as the measured hydrogen concentration of the exhaust gas in the exhaust gas path, a determination of the quantity of hydrogen can then be carried out via temporal integration. The quantity of hydrogen determined in this way can then be used as a basis for calculating the hydrogen concentration of the anode gas. This is because the hydrogen concentration of the anode gas is preferably calculated by dividing the quantity of hydrogen in the exhaust gas and the quantity of gas introduced from the anode path into the exhaust gas path.

Preferably, to calculate the total molecular flow, the molecular flow of the cathode exhaust gas and the molecular flow of the anode exhaust gas introduced from the anode path into the exhaust gas path by purging are determined in advance. The total molecular flow is thus comprised of the two individual molecular flows of the cathode and anode exhaust gases introduced into the exhaust gas path.

The molecular flow of the cathode exhaust gas is known systemically through knowledge of the characteristic map of a cathode-side air compressor and various air mass measurements as well as through knowledge of the converted oxygen quantity, the air pressure, and the relative air humidity. The molecular flow of the anode exhaust gas can be determined. Preferably, in order to determine the molecular flow of the anode exhaust gas, the gas quantity introduced by purging out of the anode path into the exhaust gas path is divided by the duration of the purge operation.

This in turn requires that the quantity of gas introduced from the anode path into the exhaust gas path be known. Thus, in the further development of the invention, it is proposed that the quantity of gas introduced from the anode path into the exhaust gas path by purging is determined from the hydrogen quantity freshly supplied to the anode path and the hydrogen quantity converted at constant anode pressure. The converted quantity of hydrogen results from the quantity of hydrogen required in order to generate flow and from the stack flow, preferably over the duration of the purge operation. This quantity of hydrogen is subtracted from the quantity of hydrogen that is freshly supplied to the anode path during the purging operation. Consequently, the freshly supplied quantity of hydrogen can be used in order to infer the quantity of gas extracted by purging. A requirement for the assumption is that the anode pressure does not change during the integration period.

In addition, an analysis unit for a fuel cell system is proposed, with the help of which the method according to the invention can be carried out. The analysis unit is connected in a data-transmitting manner to a hydrogen sensor, which is arranged in an exhaust gas path of the fuel cell system. The measurement data necessary for carrying out the method is thus available to the analysis unit. If further information is required, it can also be conducted to the analysis unit.

BRIEF DESCRIPTION OF THE DRAWING

The method according to the invention and its advantages are explained in further detail below on the basis of the attached drawing. This drawing shows the preferred workflow of a method according to the invention in a block circuit diagram.

DETAILED DESCRIPTION

The workflow of a method according to the invention, as exemplified in the block diagram, comprises multiple method steps that can be carried out sequentially or in parallel. A basic method step is to measure the hydrogen concentration of the exhaust gas in the exhaust gas path, referred to herein as method step 10. Based on this measured value and a previously determined total molecular flow in the exhaust gas path, a hydrogen quantity determination is carried out via temporal integration in method step 20. The determination of the total molecular flow includes the method steps 11 and 16, in which the molecular flow of the cathode exhaust gas is first determined (method step 11) and added to the molecular flow of the anode exhaust gas introduced into the exhaust gas path (method step 16). While the molecular flow of the cathode exhaust gas can be assumed to be known, the molecular flow of the anode exhaust gas still needs to be determined. For this purpose, the anode exhaust gas quantity introduced by purging into the exhaust gas path is divided by the duration of the purging operation (method step 15). The quantity of anode exhaust gas introduced into the exhaust gas path by purging is previously determined in a method step 14. This is preceded by method steps 12 and 13, which include the integration of the freshly supplied quantity of hydrogen into the anode path over the duration of the purging operation (method step 12) as well as the subtraction of the quantity of hydrogen consumed during the purging operation for flow generation (method step 13). A requirement for the assumption is that the anode pressure does not change during the integration period.

Based on the quantity of gas determined in method step 14 that has been introduced from the anode path into the exhaust gas path and based on the quantity of hydrogen in the exhaust gas determined in method step 20, the hydrogen concentration in the anode path can finally be calculated in method step 30. For this purpose, the quantity of hydrogen determined in method step 20 is divided by the quantity of gas determined in method step 14.

The invention claimed is:

1. A method for operating a fuel cell system with at least one fuel cell which is supplied with hydrogen via an anode path and oxygen via a cathode path, wherein anode exhaust gas exiting the fuel cell is recirculated, but from time to time a part of the anode exhaust gas is introduced into an exhaust gas path, which conducts the cathode exhaust gas, by purging the exhaust gas out of the anode path, and wherein a hydrogen concentration of the exhaust gas is measured in the exhaust gas path using a hydrogen sensor, wherein the hydrogen and/or nitrogen concentration of anode gas in the anode path before the last purge is calculated on the basis of the measured hydrogen concentration, a quantity of gas introduced into the exhaust gas path from the cathode path and from the anode path, and a quantity of hydrogen which is freshly supplied to the anode path.

2. The method according to claim 1, wherein the hydrogen concentration of the anode gas is calculated and, knowing the hydrogen concentration, the nitrogen concentration of the anode gas is determined.

3. The method according to claim 1, wherein a total molecular flow is calculated from the gas quantities introduced into the exhaust gas path and a determination of the hydrogen quantity is performed via temporal integration on the basis of the calculated total molecular flow as well as the measured hydrogen concentration of the exhaust gas in the exhaust gas path.

4. The method according to claim 3, wherein the hydrogen concentration of the anode gas is calculated by dividing the quantity of hydrogen in the exhaust gas and the quantity of gas introduced from the anode path into the exhaust gas path.

5. The method according to claim 3, wherein, in order to calculate the total molecular flow, the molecular flow of the cathode exhaust gas and the molecular flow of the anode exhaust gas introduced from the anode path into the exhaust gas path by purging are determined in advance.

6. The method according to claim 5, wherein, in order to determine the molecular flow of the anode exhaust gas, the gas quantity introduced by purging out of the anode path into the exhaust gas path is divided by the duration of the purge operation.

7. The method according to claim 1, wherein the quantity of gas introduced from the anode path into the exhaust gas path by purging is determined from the hydrogen quantity freshly supplied to the anode path and a quantity of hydrogen converted at constant anode pressure.

8. An analysis unit for a fuel cell system, wherein the analysis unit is connected in a data-transmitting manner to a hydrogen sensor arranged in an exhaust gas path of the fuel cell system, wherein the analysis unit is configured to operate a fuel cell system with at least one fuel cell which is supplied with hydrogen via an anode path and oxygen via a cathode path, wherein anode exhaust gas exiting the fuel cell is recirculated, but from time to time a part of the anode exhaust gas is introduced into an exhaust gas path, which conducts the cathode exhaust gas, by purging the exhaust gas out of the anode path, and wherein a hydrogen concentration of the exhaust gas is measured in the exhaust gas path using a hydrogen sensor, and determine the hydrogen and/or nitrogen concentration of anode gas in the anode path before the last purge based on the measured hydrogen concentration, a quantity of gas introduced into the exhaust gas path from the cathode path and from the anode path, and a quantity of hydrogen which is freshly supplied to the anode path.

* * * * *